April 17, 1934.   G. A. RICHTER   1,955,092
PRODUCTION OF CELLULOSE FOR VISCOSE MAKING
Filed Oct. 19, 1931
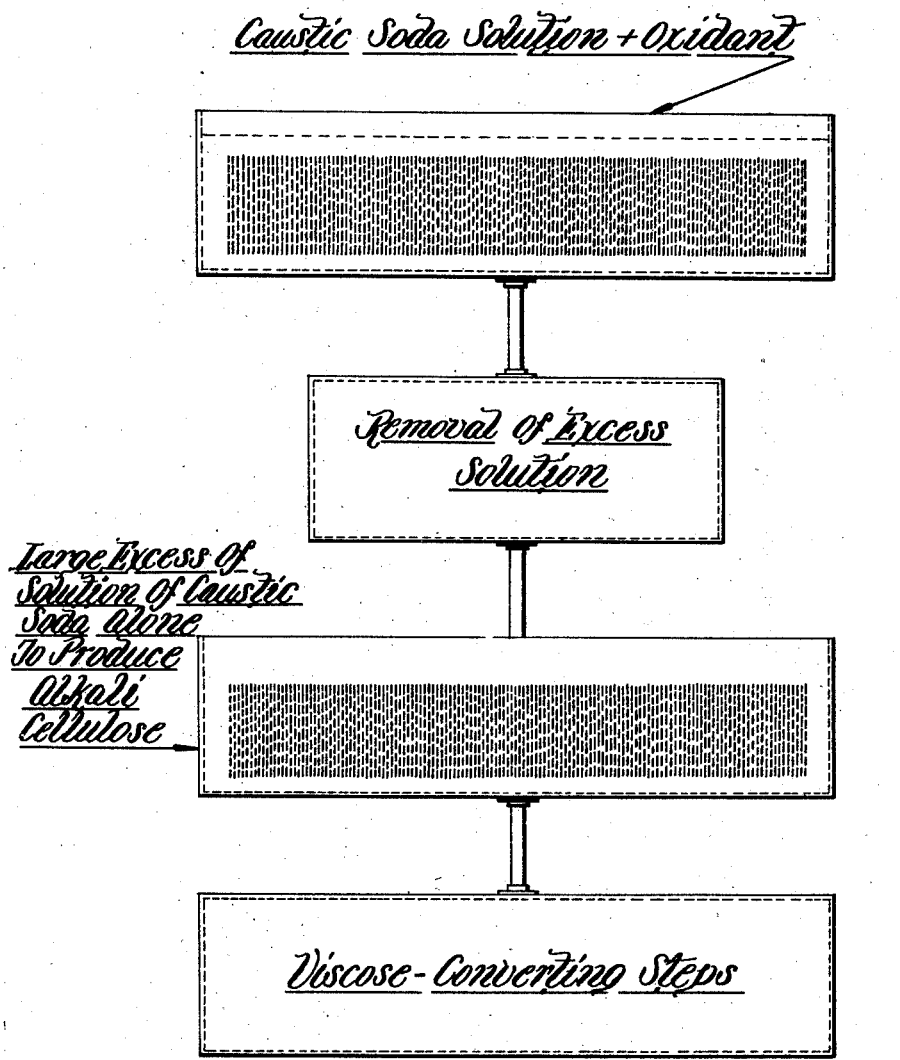
Inventor
George A. Richter
by Wright, Brown, Quinby & May
Attys Patented Apr. 17, 1934

1,955,092

UNITED STATES PATENT OFFICE 1,955,092

PRODUCTION OF CELLULOSE FOR VISCOSE-MAKING

George A. Richter, Berlin, N. H., assignor to Brown Company, Berlin, N. H., a corporation of Maine Application October 19, 1931, Serial No. 569,686

14 Claims. (Cl. 260—100)

This invention relates to the production of cellulose of low solution viscosity, and more especially a product designed for conversion into viscose syrup with little, if any, ageing of the soda cellulose prepared therefrom.

In accordance with the present invention, the cellulose fiber used as a raw material is initially steeped in a caustic soda solution containing an oxidant under conditions of time, temperature and composition of solution not only to purify the fiber but to lower its solution viscosity to a value where with little, if any, ageing of so-called soda cellulose prepared from the fiber, the soda cellulose can be converted into a highly satisfactory viscose syrup. This initial steeping operation can be performed in a caustic soda solution of mercerizing or non-mercerizing strength. In any event, however, the solution is of sufficient caustic soda concentration to offset any tendency for the oxidant to degrade the fiber. After such steeping, the easily removable steeping solution is separated from the fiber. The fiber is then steeped in a second solution containing only caustic soda, which serves to convert the fiber into soda cellulose. Such residual oxidant as is associated with the fiber is greatly diluted and is practically displaced by the excess solution used in the second steeping operation, and so does not cause trouble during the practice of subsequent viscose converting operations. Thus, after the second step operation, the low-solution-viscosity fiber may be pressed and converted into viscose syrup directly by mixing the required amount of carbon bisulphide therewith, and perhaps some additional caustic soda.

On the accompanying drawing, I have illustrated by a flow sheet the major operations which constitute my process. The cellulose fiber used as a raw material may be that which is ordinarily produced for viscose-making, namely, sheets of sulphite pulp, purified wood pulp, cotton, etc. It is also possible to use unbleached pulps, such as sulphite and kraft, for the oxidant used in the initial steeping solution promotes a deliquefication of such pulp. As shown on the drawing, the sheets are immersed in a solution containing a suitable amount of caustic soda and an oxidant. For instance, the solution may be of 10% caustic soda concentration and contain about 1% or more of sodium hypochlorite. If desired, the alkali concentration in the solution may be as high as 18%, or even higher. After soaking in such a solution at a temperature of from about 20° to 50° C. over a period of about thirty minutes to two hours, the sheets are not only freed from non-alpha cellulose components, but the desired marked lowering of the solution viscosity of the fiber has ensued. As indicated on the drawing, I then proceed to remove the sheets from the steeping solution and to allow drainage therefrom of the excess solution. If desired, free drainage may be supplemented by a positive pressing operation. The solution drained and/or pressed from the sheets may be recovered and, after fortification with caustic soda and oxidant, be reused in the treatment of fresh sheets. The sheets freed from easily removable initial steeping solution are then immersed in a secondary steeping solution, which, as indicated on the drawing, is made up of caustic soda alone. The large volume of secondary steeping solution so greatly dilutes the residual oxidant and reaction products present in the sheets that, for all practical purposes, the saturated sheets contain only caustic soda as the absorbed chemical. The secondary steeping solution is preferably of about 18% caustic soda concentration, so as to correspond with the caustic soda solution ordinarily employed in converting cellulose fiber into soda cellulose. This secondary steeping solution is also effective in removing residual lignin, resins, iron, and other non-alpha cellulose components from the fiber. The saturated sheets are removed from the secondary steeping solution and put through the steps of viscose conversion, as stated on the drawing. To this end, solution may be drained and pressed from the saturated sheets until the caustic soda to cellulose ratio is appropriate for xanthation. The sheets of soda cellulose thus produced may then be ground into crumbs, which may be directly treated with carbon bisulphide to form the xanthate. The resulting soda cellulose crumbs are of higher alpha cellulose content than are the crumbs prepared from sheets which have been treated and aged as ordinarily to acquire the desired low solution viscosity. In other words, the aging as ordinarily practised progressively reduces the alpha cellulose content of the fiber, whereas fiber pulp having both a high alpha cellulose content and the desired low solution viscosity does not depreciate sensibly in alpha cellulose content during the grinding operation and up to the time it is transformed into the viscose syrup. It is thus seen that my process does away with the necessity of ageing the soda cellulose under controlled conditions for a long period of time before the xanthating operation. At the same time, my process yields a xanthate which dissolves nicely in a caustic soda solution to form a viscose syrup eminently satisfactory for the manufacture of artificial silk, "Cellophane", and other viscose ultimates. In special cases, when one desires a fiber of a solution viscosity much lower than that required, for example, in the spinning of artificial silk, ageing of the soda cellulose may be resorted to in producing a product of extremely low solution viscosity.

The caustic soda solution drained and/or pressed from the sheets after the secondary steeping operation is recovered as a batch distinct from the recovered caustic soda solution containing oxidant. The recovered secondary steeping solution can be reused, after fortification with caustic soda, in the secondary steeping bath, but, as the secondary steeping bath becomes unduly contaminated with oxidant or reaction products, a certain amount of secondary steeping solution may be delivered to the primary steeping bath and be replaced by fresh caustic soda solution. A proper amount of oxidant may, of course, be added to the solution transferred from the secondary steeping bath to the primary steeping bath, so as to maintain the primary steeping bath at the desired composition. The primary steeping bath in time becomes contaminated with an excessive amount of less-resistant celluloses, ligneous matter, resins, etc., at which time solution may be withdrawn from the initial steeping bath and sent to a suitable system for purifying the solution, as by means of dialyzing membranes or special filters, or for the recovery of the valuable sodium constituent. An important advantage of my process is that I am enabled to practise the initial step of purifying the cellulose fiber and lowering its solution viscosity with the solution which becomes spent or non-useful as the medium for converting the fiber into alkali cellulose. My process is practised without a washing operation, and hence without dilution of the solutions employed therein. This means that a given amount of solution goes through a large number of cycles with different batches of fiber before it is discarded or sent to a purifying or recovery system. Nevertheless, the soda celluloses prepared by my process are of great purity and yield high grade viscose syrups. The feature of removing excess solution from the sheets after the initial steeping operation ensures the securement of pure soda cellulose, for such oxidant, reaction products, or other impurities as are entrained in the sheets are so greatly diluted by the secondary steeping solution as to become insignificant. Furthermore, most of the fiber impurities reacted upon and dissolved by the initial steeping solution are left behind in that solution, particularly since precaution is taken to maintain the initial steeping solution at a condition or composition of dynamic equilibrium, where fiber impurities pass from the sheets into the steeping solution.

The procedure hereinbefore given admits of variations while still falling within the purview of the present invention. Thus, the initial steeping solution may be of a caustic soda concentration of as low as 5%, in which case, too, the fiber would undergo refinement or increase in alpha cellulose content. More concentrated solutions, however, are conductive to a greater refinement of the fiber, especially as regards removal of pentosan and hemicellulose groups therefrom, but the concentration of the solution need not necessarily be one at which mercerization of the fiber ensues. The temperature of the initial steeping solution may be as low as 10° C., or even lower, or as high as 60° C., or even higher, depending upon the amount of oxidant present in the solution and the time of contact of the fiber with the solution. In this connection, it might be stated that the use of comparatively low temperatures is conductive to a greater removal of pentosans than the use of comparatively high temperatures. On the other hand, the oxidant is more active in lowering the solution viscosity of the fiber at higher than at lower temperatures. It is possible to secure the desired purification and lowering of the solution viscosity of the fiber in a comparatively short period of time, say about thirty minutes, by using about 1% to 2% sodium hypochlorite bleach, based on solution, in a caustic soda solution of about 10% concentration at about 40° C. The bleach used is calculated in terms of 35% available chlorine. The amount of bleach may be increased or decreased, depending upon the kind of pulp used as a raw material and the degree to which it is desired to lower the solution viscosity of the pulp. In the case of some pulps, such as kraft, I may use upwards of about 4% bleach in the initial steeping solution.

The temperature of the secondary steeping solution may be 20° C., as is ordinarily the case of the caustic soda solution used in preparing alkali cellulose. When the initial steeping solution is used at higher temperature, say 40° C., the temperature of the secondary steeping solution may be lower than 20° C., say 15° C., so that when it commingles with the residual warm initial steeping solution in the sheets, the resultant temperature in the sheets is about 20° C.—the temperature at which xanthation is usually effected. The secondary steeping solution is, as already stated, one of about 18% strength, and accordingly mercerizes the fiber, if this effect has not already been produced in the primary steeping bath.

My process is not restricted to any particular cellulose fiber or to any specific physical form of cellulose fiber. When applied to cotton linters or a refined wood pulp, my process is primarily valuable from the standpoint of lowering the solution viscosity of the fiber, whereas in the case of an unrefined or unbleached wood pulp like sulphite, my process presents the additional important advantage that the fiber is refined to high alpha cellulose and low lignin content. The standard equipment in viscose plants can be used when my invention is applied to sheeted cellulose fiber, but loose or bulk fiber may also be processed in accordance with my invention.

Oxidants other than sodium hypochlorite may constitute the auxiliary chemical in the primary steeping solution. I prefer, however, to use sodium base oxidants, like sodium peroxide, especially when the liquor discarded from the primary steeping bath is to be delivered to a recovery system. An oxidant whose base is sodium simplifies the recovery operations, as would not be the case were the base of the oxidant calcium or another element. So, too, I prefer to use an oxidant which is colorless and does not give rise to colored reaction products. Thus, sodium hypochlorite not only is colorless but, when consumed, yields sodium chloride and other colorless reaction products. Sodium peroxide and calcium hypochlorite are similar in this respect to sodium hypochlorite, but, as already stated, I prefer not to use other than sodium base oxidants.

I claim:

1. A process which comprises steeping cellulose fiber in a caustic soda solution containing an oxidant, displacing the solution associated with the fiber by a solution of caustic soda alone to form soda cellulose, and xanthating the soda cellulose.

2. A process which comprises steeping cellulose fiber in a caustic soda solution containing an oxidant, removing the fiber from the steeping solution, again steeping the fiber in a solution of caustic soda alone to displace residual initial steeping solution from the fiber and to form soda cellulose, and directly xanthating the soda cellulose.

3. A process which comprises steeping cellulose fiber in a caustic soda solution containing an oxidant to transform the fiber into a directly xanthatable state, removing the fiber from the steeping solution, again steeping the fiber in a solution of caustic soda alone to displace residual oxidant substantially completely from the fiber and to form soda cellulose, and directly xanthating the soda cellulose.

4. A process which comprises steeping the cellulose fiber in a caustic soda solution containing an oxidant, removing the fiber from the steeping solution, separating easily removable solution from the fiber, again steeping the fiber in a solution of caustic soda alone to displace residual oxidant substantially completely from the fiber and to form soda cellulose, and directly xanthating the soda cellulose.

5. A process which comprises steeping cellulose fiber in a caustic soda solution containing an oxidant, removing the fiber from the steeping solution, again steeping the fiber in a solution of caustic soda alone to displace the initial steeping solution from the fiber and to form soda cellulose, removing the fiber from the secondary steeping solution, extracting excess solution therefrom, and using said extracted solution in making up said initial steeping solution.

6. A process which comprises steeping cellulose fiber in a caustic soda solution containing a colorless oxidant incapable of forming colored reaction products, displacing the solution associated with the fiber by a solution of caustic soda alone to form soda cellulose, and xanthating the soda cellulose.

7. A process which comprises steeping cellulose fiber in a caustic soda solution containing a colorless sodium base oxidant of the nature of sodium hypochlorite, displacing the solution associated with the fiber by a solution of caustic soda alone to form soda cellulose, and xanthating the soda cellulose.

8. A process which comprises steeping sheets of cellulose fiber in a caustic soda solution containing a subordinate proportion of oxidant, removing the sheets from the solution, again steeping the sheets in a mercerizing solution of caustic soda alone to displace the residual oxidant substantially completely from the sheets and to form soda cellulose, and directly xanthating the soda cellulose.

9. A process which comprises steeping sheets of cellulose fiber for about thirty minutes to two hours at a temperature of from about 50° to 60° C. in a caustic soda solution of at least about 5% strength and containing at least about 1% sodium hypochlorite, removing the sheets from the solution, draining excess solution from the sheets, again steeping the sheets in a mercerizing solution of caustic soda alone to displace residual oxidant substantially completely from the sheets and to form soda cellulose, and xanthating the soda cellulose.

10. A process which comprises steeping cellulose fiber in a caustic soda solution containing a subordinate proportion of an oxidant, and displacing the solution associated with the unwashed fiber by a solution of caustic soda alone to form soda cellulose.

11. A process which comprises steeping sheets of cellulose fiber in a caustic soda solution containing a subordinate proportion of an oxidant, squeezing said steeped sheets to remove free solution therefrom, and displacing residual solution in the sheets by a solution of caustic soda alone to form soda cellulose.

12. A process which comprises steeping cellulose fiber in a caustic soda solution of at least about 5% strength containing a subordinate proportion of an oxidant, and displacing the solution associated with the unwashed fiber by a mercerizing solution of caustic soda alone to form soda cellulose.

13. A process which comprises steeping cellulose fiber in a mercerizing caustic soda solution containing an oxidant, and displacing the solution associated with the unwashed fiber by a mercerizing solution of caustic soda alone to form soda cellulose.

14. A process which comprises steeping sheets of cellulose fiber in a mercerizing caustic soda solution containing a subordinate proportion of oxidant, squeezing said steeped sheets to remove free solution therefrom, and displacing residual solution in the sheets by a mercerizing solution of caustic soda alone to form soda cellulose.

GEORGE A. RICHTER.